United States Patent
Nemati et al.

(10) Patent No.: US 12,423,181 B2
(45) Date of Patent: Sep. 23, 2025

(54) LOW COMPLEXITY SYSTEM AND METHOD FOR DETECTION AND CORRECTION OF DATA WITH ADDITIONAL METADATA FROM CORRUPTION

(71) Applicant: Microsoft Technology Licensing, LLC, Redmond, WA (US)

(72) Inventors: Majid Anaraki Nemati, San Diego, CA (US); Terry M. Grunzke, Boise, ID (US); Brett K. Dodds, Boise, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/336,900

(22) Filed: Jun. 16, 2023

(65) Prior Publication Data

US 2024/0419541 A1   Dec. 19, 2024

(51) Int. Cl.
   *G06F 11/10* (2006.01)
(52) U.S. Cl.
   CPC ...... *G06F 11/1068* (2013.01); *G06F 11/1048* (2013.01)
(58) Field of Classification Search
   CPC .................... G06F 11/1068; G06F 11/1048
   See application file for complete search history.

(56) References Cited

U.S. PATENT DOCUMENTS

| | | | |
|---|---|---|---|
| 5,206,864 A | 4/1993 | McConnell | |
| 5,948,118 A | 9/1999 | Higurashi | |
| 7,711,068 B2 | 5/2010 | Shokrollahi | |
| 8,037,389 B2 | 10/2011 | Hwang | |
| 9,183,085 B1 * | 11/2015 | Northcott | G06F 11/1012 |
| 9,236,976 B2 | 1/2016 | Shokrollahi | |
| 11,340,986 B1 | 5/2022 | Yadav | |
| 12,099,457 B2 | 9/2024 | Confalonieri | |
| 2003/0237041 A1 | 12/2003 | Cole | |
| 2005/0060628 A1 | 3/2005 | Spencer | |
| 2011/0019769 A1 | 1/2011 | Shokrollahi | |
| 2012/0137195 A1 | 5/2012 | Bueb | |
| 2016/0147598 A1 | 5/2016 | Muralimanohar | |
| 2017/0249207 A1 | 8/2017 | Sharon | |
| 2017/0271029 A1 | 9/2017 | Wang | |
| 2019/0349349 A1 | 11/2019 | Layouni | |
| 2019/0384671 A1 * | 12/2019 | Chen | G06F 11/1068 |
| 2020/0082900 A1 * | 3/2020 | Amato | G11C 29/52 |
| 2020/0394104 A1 * | 12/2020 | Brooks | G06F 11/1012 |

(Continued)

OTHER PUBLICATIONS

International Search Report and Written Opinion received for PCT Application No. PCT/US2024/033473, Nov. 7, 2024, 17 pages.

(Continued)

*Primary Examiner* — Albert Decady
*Assistant Examiner* — Grace V Braden

(57) ABSTRACT

A method, computer program product, and computing system for defining one or more groups for data included within one or more groups of memory dies included within a memory module, thus defining a first group of parity bit groups; defining a parity bit for each memory die included within the one or more groups of memory dies, thus defining a plurality of parity bits; and defining one or more parity bit groups for the plurality of parity bits, thus defining a second group of parity bit groups.

12 Claims, 5 Drawing Sheets

(56) References Cited

U.S. PATENT DOCUMENTS

| | | |
|---|---|---|
| 2021/0194506 A1 | 6/2021 | Symons |
| 2022/0107751 A1* | 4/2022 | Gorobets ............ G11C 11/5628 |
| 2022/0200654 A1 | 6/2022 | Baier |
| 2022/0221997 A1 | 7/2022 | Navon |
| 2022/0221999 A1 | 7/2022 | Navon |
| 2023/0136990 A1 | 5/2023 | Ning |
| 2023/0141358 A1 | 5/2023 | Aldana |
| 2023/0164015 A1 | 5/2023 | Kim |
| 2023/0359367 A1 | 11/2023 | Nemati |
| 2023/0421179 A1 | 12/2023 | Aldana |
| 2024/0419539 A1 | 12/2024 | Nemati |

OTHER PUBLICATIONS

Invitation to Pay Additional Fees received for PCT Application No. PCT/US2024/033473, Sep. 16, 2024, 9 pages.

Chen, et al., "Error-Correcting Codes for Semiconductor Memory Applications: A State-of-the-Art Review", IBM Journal of Research and develpment, vol. 28, Issue No. 2, Mar. 1984, pp. 124-134.

Dutta, et al., "Multiple Bit Upset Tolerant Memory Using a Selective Cycle Avoidance Based SEC-DED-DAEC Code", 25th IEEE VLSI Test Symposium (VTS'07), 2007, 06 Pages.

International Search Report and Written Opinion recieved for PCT Application No. PCT/US2024/032334, Sep. 11, 2024, 13 pages.

Non-Final Office Action mailed on Sep. 26, 2024, in U.S. Appl. No. 18/334,938, 16 pages.

Notice of Allowance mailed on Mar. 3, 2025, in U.S. Appl. No. 18/334,938, 06 pages.

Rhee, et al., Concatenated Reed-Solomon Code with Hamming Code for DRAM Controller, second International Conference on Computer Engineering and Applications. vol. 1, 2010, pp. 291-295.

Notice of Allowance mailed on Apr. 11, 2025, in U.S. Appl. No. 18/334,938, 06 pages.

* cited by examiner

LOW COMPLEXITY SYSTEM AND METHOD FOR DETECTION AND CORRECTION OF DATA WITH ADDITIONAL METADATA FROM CORRUPTION

TECHNICAL FIELD

This disclosure relates to systems and methods for protecting data and, more particularly, to systems and methods for protecting data and metadata within DDR6 memory.

BACKGROUND

Some proposals for DDR6 memory allow for storage of sixty-four bits of data per cache line die and provide four additional bits per die, wherein a typical DDR6 module may include ten dies (for a total of 40 additional bits). Additionally or alternatively, these four additional bits per die may come from reading out the current on-die ECC bits used for on-die SEC on DDR5. These additional bits may be used to provide data protection for the data stored within the sixty-four bits of data storage space, but there are ways to provide such data protection without adding errors to error free dies.

The traditional way of protecting dies against random errors is to use on-die single error correction (SEC) for each die, which requires seven bits per die. For example, current DDR5 memory uses SEC (136,128) and 8 extra bits per die due to having to cover the ECC bits as well. And being the typical DDR6 module includes ten dies, a total of seventy bits are need to protect ten dies (of which only forty bits are available).

Approaches to provide data protection for these ten dies include combining the data on every few dies to provide SEC protection with the available forty bits. Unfortunately, these approaches have shortcomings including:

- In the event of a die failure, most probably one error will be added to either the failed die or one of the error free dies included in the same SEC block.
- The dies cannot be protected individually. Therefore, if two dies each have a single random error, a third error may be added (to either an error free die or one of the dies with error).
- There is no protection against a simultaneous die failure and single random errors on other dies in the same SEC block.

BRIEF DESCRIPTION OF THE DRAWINGS

Like reference symbols in the various drawings indicate like elements.

DETAILED DESCRIPTION OF THE PREFERRED EMBODIMENTS

As will be discussed below in greater detail, implementations of the present disclosure are configured to enable the protection of data stored within DDR6 memory via the above-described forty additional data bits. Specifically, implementations of the present disclosure utilize a combination of SEC (i.e., Single Error Correction) encoding, SECDED (i.e., Single Error Correction/Double Error Detection) encoding and/or Reed-Solomon encoding to provide data protection for the above-described sixty-four bits of data via the forty additional bits, wherein a portion of those forty additional bits may be made available to provide storage for metadata.

The details of one or more implementations are set forth in the accompanying drawings and the description below. Other features and advantages will become apparent from the description, the drawings, and the claims.

Figure 1:
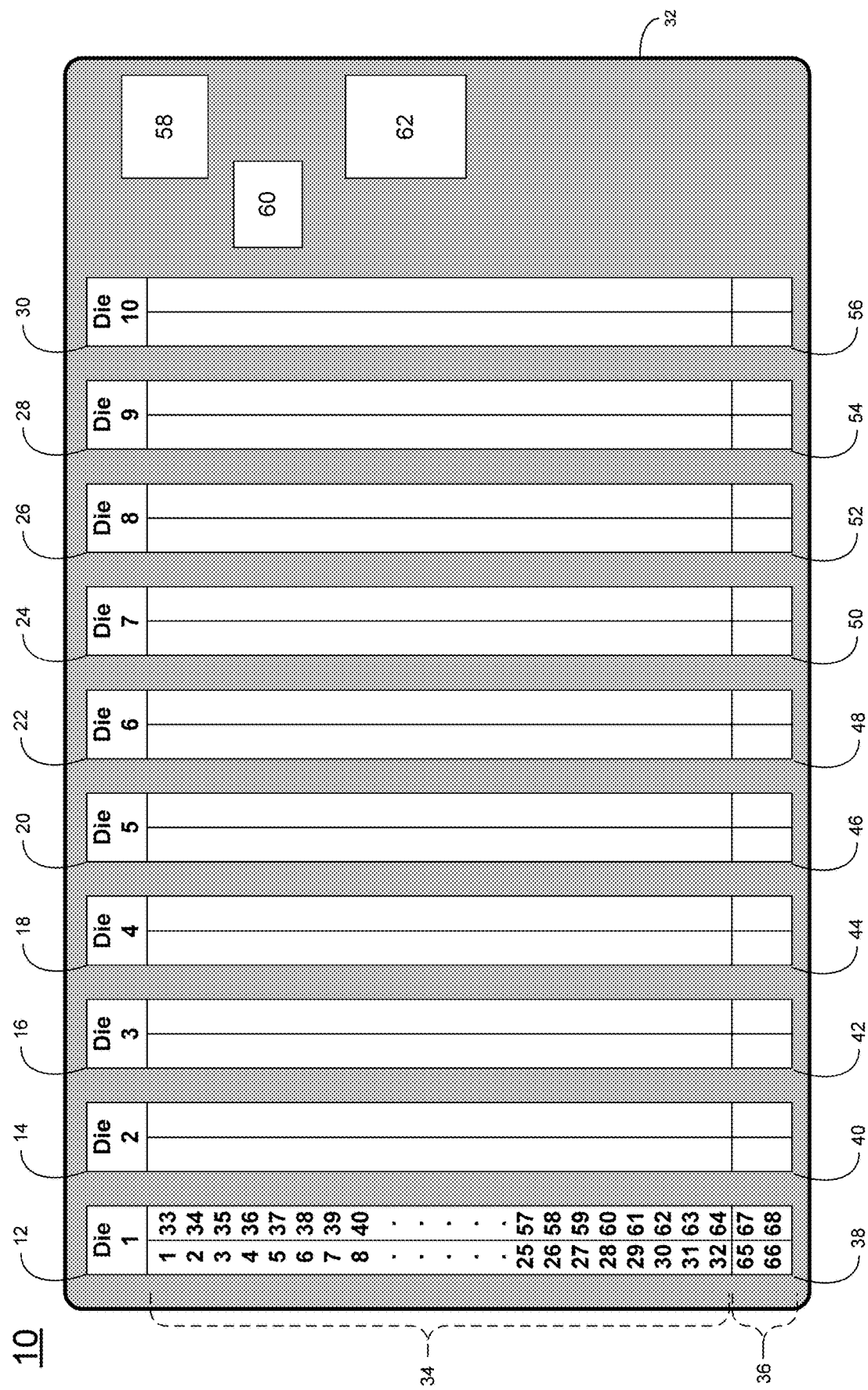
FIG. 1 is a diagrammatic view of DDR6 memory.

DDR6 Memory:

Referring to FIG. 1, there is shown DDR6 memory module 10. DDR6 memory module 10 (also known as Double Data Rate 6) is a type of computer memory technology that is used in high-performance computing systems, including desktop computers, server computers, and graphics cards. DDR6 memory module 10 is the successor to DDR5 and offers increased data transfer rates, higher capacities, and improved power efficiency compared to its predecessors. One of the key features of DDR6 memory module 10 is its higher data transfer rates. DDR6 memory modules may achieve speeds much faster that DDR5 transfer speeds. For example, DDR5 has transfer speeds of up to 6400-9600 MT/s (mega-transfers per second). The transfer speeds of DDR6 (while still in flux) may be >17,600 MT/s (mega-transfers per second), which is significantly faster than DDR5 memory. The increased data transfer rates of DDR6 memory allow for faster data access and improved overall system performance. Another advantage of DDR6 memory module 10 is its higher capacity. DDR6 memory can offer higher capacity options compared to DDR5, with likely capacities up to 64 Gb per die, while DDR5 memory currently has capacities up to 32 Gb per die. This allows for larger memory configurations in high-end systems, which can be beneficial for tasks that require a large amount of memory, such as gaming, content creation, and data-intensive applications. Further, DDR6 memory module 10 also incorporates improved power efficiency features, such as lower operating voltages and improved power management techniques. This can help reduce power consumption and heat generation, making DDR6 memory more energy-efficient compared to previous generations of DDR memory. Additionally, other benefits and advantages of DDR6 memory may be realized as the design of the same is refined and finalized.

In some implementations, DDR6 memory module 10 includes ten dies (e.g., dies 12, 14, 16, 18, 20, 22, 24, 26, 28, 30). For example, these ten dies (e.g., dies 12, 14, 16, 18, 20, 22, 24, 26, 28, 30) may be ten dies per rank per sub-channel. In the context of DDR6 memory module 10, a "die" refers to a discrete silicon chip that is part of DDR6 memory module 10. DDR6 memory modules are typically constructed using multiple memory dies (e.g., dies 12, 14, 16, 18, 20, 22, 24, 26, 28, 30) that are integrated onto a single circuit board (e.g., circuit board 32).

A memory die contains the memory cells, sense amplifiers, and other necessary components that enable data storage and retrieval. Each die (e.g., dies 12, 14, 16, 18, 20, 22, 24, 26, 28, 30) is organized into multiple banks, which are further divided into rows and columns of memory cells. The memory cells store binary data in the form of electrical charges, which are read and written using the sense amplifiers and other circuitry on the die.

Memory dies (e.g., dies 12, 14, 16, 18, 20, 22, 24, 26, 28, 30) in DDR6 memory modules are typically manufactured using advanced semiconductor fabrication processes, which involve the deposition and patterning of multiple layers of materials on a silicon substrate. These processes allow for the miniaturization of the memory cells and other components, which in turn enables higher memory capacities, faster data transfer rates, and improved power efficiency.

Multiple memory dies (e.g., dies 12, 14, 16, 18, 20, 22, 24, 26, 28, 30) are typically used in a single DDR6 memory module (e.g., DDR6 memory module 10) to achieve higher overall memory capacity. These dies (e.g., dies 12, 14, 16, 18, 20, 22, 24, 26, 28, 30) are often connected in parallel and controlled by a memory controller (not shown), which coordinates their operations and manages the flow of data between DDR6 memory module 10 and the rest of the system (not shown). This memory controller (not shown) may be a portion of a CPU (not shown) or an off-module device, such as a CXL controller (not shown). The number of memory dies (e.g., dies 12, 14, 16, 18, 20, 22, 24, 26, 28, 30) in a DDR6 memory module (e.g., DDR6 memory module 10) depends on the desired capacity and performance characteristics of the module.

As discussed above, each of the ten dies (e.g., dies 12, 14, 16, 18, 20, 22, 24, 26, 28, 30) included within DDR6 memory module 10 includes sixty-four data storage bits (e.g., data storage bits 34) and four additional bits (e.g., bits 36) that might be used for metadata or protection.

Data Protection Process:

As discussed above, the traditional way of protecting dies (e.g., dies 12, 14, 16, 18, 20, 22, 24, 26, 28, 30) against random errors is to use on-die single error correction (SEC) for each die (e.g., each of dies 12, 14, 16, 18, 20, 22, 24, 26, 28, 30). Unfortunately and as discussed above, such protection requires seven bits per die (e.g., seven bits for each of dies 12, 14, 16, 18, 20, 22, 24, 26, 28, 30). And being the typical DDR6 module (e.g., DDR6 memory module 10) includes ten dies (e.g., dies 12, 14, 16, 18, 20, 22, 24, 26, 28, 30), a total of seventy bits are needed to protect the data included within the sixty-four data storage bits (e.g., data storage bits 34) included within each of the ten die (e.g., each of dies 12, 14, 16, 18, 20, 22, 24, 26, 28, 30), of which only forty bits (e.g., additional bits 36) are available.

As also discussed above, implementations of the present disclosure are configured to enable the protection of data stored within DDR6 memory module (e.g., DDR6 memory module 10) via the above-described forty additional data bits. Specifically, implementations of the present disclosure utilize a combination of SEC (i.e., Single Error Correction) encoding, SECDED (i.e., Single Error Correction/Double Error Detection) encoding, even/odd parity bits and/or Reed-Solomon encoding to provide data protection for the above-described sixty-four bits of data via the forty additional bits, wherein a portion of those forty additional bits may be made available to provide storage for metadata.

Figure 2:
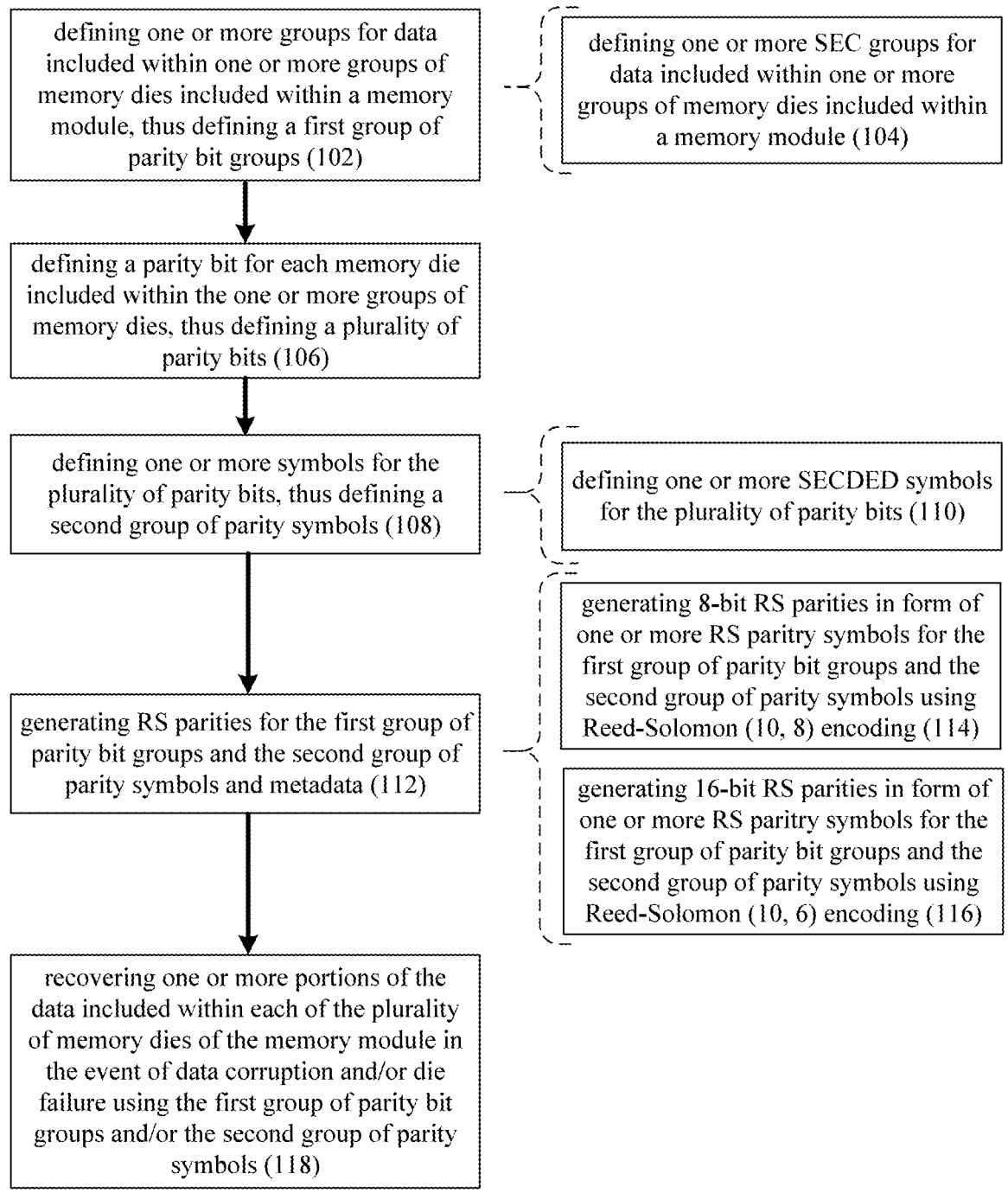
FIG. 2 is a flow chart of one implementation of a data protection process according to an embodiment of the present disclosure.
Figure 3:
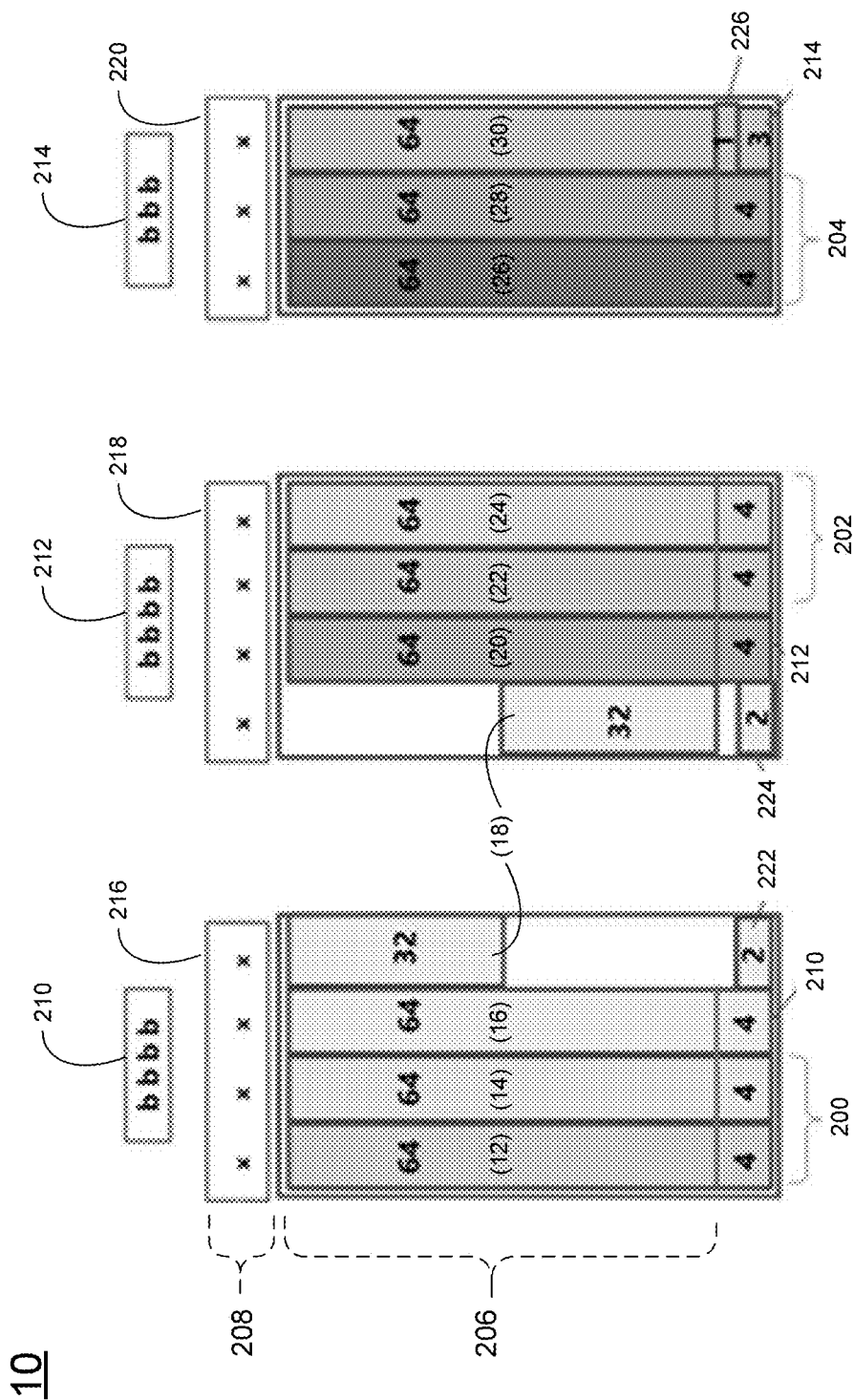
FIG. 3 is a diagrammatic view of a DDR6 memory and one implementation of the data protection process of FIG. 2.

As also discussed above, implementations of the present disclosure utilize a combination of SEC (i.e., Single Error Correction) encoding, SECDED (i.e., Single Error Correction/Double Error Detection) encoding and/or Reed-Solomon encoding to provide data protection for the above-described sixty-four bits of data via the forty additional bits, wherein a portion of those forty additional bits may be made available to provide storage for metadata Data Protection Using Multiple SECDEDs:

Referring also to FIGS. 2-3, data protection process 100 may define 102 one or more groups (e.g., parity bit groups 200, 202, 204) for data (e.g., data 206) included within each of a plurality of memory dies (e.g., each of dies 12, 14, 18, 20, 22, 24, 26, 28, 30) of a memory module (e.g., DDR6 memory module 10), thus defining a first group of parity bit groups (wherein the first group includes parity bit groups 200, 202, 204).

For example:
  data protection process 100 may define 102 parity bit group 200 for the data (e.g., data 206) included within memory dies 12, 14, 16 and a first half of memory die 18, wherein parity bit group 200 may enable data protection process 100 to correct and/or identify data errors included within memory dies 12, 14, 16 and the first half of memory die 18;
  data protection process 100 may define 102 parity bit group 202 for the data (e.g., data 206) included within a second half of memory die 18 and memory dies 20, 22, 24, wherein parity bit group 202 may enable data protection process 100 to correct and/or identify data errors included within the second half of memory die 18 and memory dies 20, 22, 24; and
  data protection process 100 may define 102 parity bit group 204 for the data (e.g., data 206) included within memory dies 26, 28, 30, wherein parity bit group 204 may enable data protection process 100 to correct and/or identify data errors included within memory dies 26, 28, 30.

When defining 102 one or more groups (e.g., parity bit groups 200, 202, 204) for data (e.g., data 206) included within each of a plurality of memory dies (e.g., each of dies 12, 14, 16, 18, 20, 22, 24, 26, 28, 30) of a memory module (e.g., DDR6 memory module 10), thus defining a first group of parity bit groups (e.g., parity bit groups 200, 202, 204), data protection process 100 may define 104 one or more SEC groups (e.g., parity bit groups 200, 202, 204) for data (e.g., data 206) included within each of a plurality of memory dies (e.g., each of dies 12, 14, 16, 18, 20, 22, 24, 26, 28, 30) of a memory module (e.g., DDR6 memory module 10).

SEC (Single Error Correction) is a method used to detect and correct errors in data transmission or storage systems. It is commonly used in applications such as digital communications, storage devices, and error correction codes. The basic idea behind SEC encoding is to add redundancy to the original data in a structured manner, which allows for the detection and correction of errors. This is typically done by adding additional bits, called parity or check bits, to the original data.

Here's a simplified explanation of how SEC encoding works:
  Data Division: The original data is divided into fixed-size blocks or packets. Each block consists of both the original data bits and additional parity bits.
  Parity Calculation: For each block, the parity bits are calculated based on the values of the original data bits. The specific method used to calculate the parity bits depends on the type of SEC code being used.
  Error Detection: During transmission or storage, errors may occur, causing bits to be flipped or corrupted. By comparing the received data with the parity bits, it is possible to detect the presence of errors. If the received data matches the calculated parity bits, no errors are detected. However, if discrepancies are found, errors are present.
  Error Correction: Once errors are detected, the SEC encoding scheme allows for the correction of some types of errors. The specific method of error correction varies depending on the code used. Generally, error correction is achieved by analyzing the parity bits and using them to identify and fix the erroneous bits.

Decoding: The corrected data is extracted from the received blocks, and the original information is reconstructed. If the SEC code allows for error correction, the decoded data should match the original data, except for rare cases where uncorrectable errors occur.

It's important to note that different SEC codes have different properties, such as the number of errors they can detect or correct, the overhead they introduce in terms of additional bits, and their complexity. The choice of a particular SEC code depends on the requirements of the specific application, including the desired error detection and correction capabilities, available resources, and the level of reliability needed. Overall, SEC encoding provides a way to enhance data integrity and robustness in systems where errors are likely to occur, ensuring accurate and reliable transmission or storage of information.

Data protection process 100 may define 106 a parity bit (e.g., an odd parity bit or an even parity bit) for each memory die (e.g., each of dies 12, 14, 16, 18, 20, 22, 24, 26, 28, 30) included within the one or more groups of memory dies (e.g., dies 12, 14, 16, 18, 20, 22, 24, 26, 28, 30), thus defining a plurality of parity bits (e.g., parity bits 208).

Odd and even parity are methods used to add an extra bit, known as a parity bit (e.g., parity bits 208), to a sequence of binary data. The purpose of the parity bit is to enable the detection of errors during data transmission. In odd parity, the parity bit is chosen so that the total number of '1' bits in the data sequence (including the parity bit) is odd. If the data sequence already has an odd number of '1' bits, the parity bit is set to '0' to maintain the odd parity. If the data sequence has an even number of '1' bits, the parity bit is set to '1' to make the total number of '1' bits odd. For example, let's consider the data sequence 11010. The total number of '1' bits in this sequence is three, which is an odd number. To maintain odd parity, the parity bit would be set to '0', making the entire transmitted sequence 110100. In even parity, the parity bit is selected so that the total number of '1' bits in the data sequence (including the parity bit) is even. If the data sequence already has an even number of '1' bits, the parity bit is set to '0' to maintain even parity. If the data sequence has an odd number of '1' bits, the parity bit is set to '1' to make the total number of '1' bits even. Continuing from the previous example, if we want to transmit the data sequence 11010 using even parity, the parity bit would be set to '1'. This is because the data sequence has an odd number of '1' bits (three), and setting the parity bit to '1' would result in an even number of '1' bits. So the transmitted sequence would be 110101. During the receiving process, the parity of the received data (including the parity bit) is recalculated. If the calculated parity matches the expected parity (odd or even, depending on the scheme used), it indicates that no error has occurred during transmission. However, if the calculated parity does not match the expected parity, it signifies that an error has occurred, and further error detection and correction mechanisms may be employed.

Data protection process 100 may define 108 one or more symbols (e.g., symbols 210, 212, 214) for the plurality of parity bits (e.g., parity bits 208), thus defining a second group of parity symbols (e.g., symbols 210, 212, 214).

For example:

a first group of parity bits (e.g., parity bits 216) may be defined 106 for memory dies 12, 14, 16 and a first half of memory die 18, and data protection process 100 may define 108 one or more symbols (e.g., symbol 210) for the first group of parity bits (e.g., parity bits 216), wherein symbol 210 may enable data protection process 100 to correct and/or identify data errors included within memory dies 12, 14, 16 and the first half of memory die 18;

a second group of parity bits (e.g., parity bits 218) may be defined 106 for a second half of memory die 18 and memory dies 20, 22, 24, and data protection process 100 may define 108 one or more symbols (e.g., symbol 212) for the second group of parity bits (e.g., parity bits 218), wherein symbol 212 may enable data protection process 100 to correct and/or identify data errors included within second half of memory die 18 and memory dies 20, 22, 24; and a third group of parity bits (e.g., parity bits 220) may be defined 106 for memory dies 26, 28, 30, and data protection process 100 may define 108 symbols (e.g., symbol 214) for the third group of parity bits (e.g., parity bits 220), wherein symbol 214 may enable data protection process 100 to correct and/or identify data errors included within memory dies 26, 28, 30.

When defining 108 one or more symbols (e.g., symbols 210, 212, 214) for the plurality of parity bits (e.g., parity bits 208), thus defining a second group of parity symbols (e.g., symbol 210, 212, 214), data protection process 100 may define 110 one or more SECDED symbols (e.g., symbols 210, 212, 214) for the plurality of parity bits (e.g., parity bits 208).

SECDED (Single Error Correction, Double Error Detection) is a type of error-correcting code used in computer memory and storage systems. It is designed to detect and correct single-bit errors, and to detect double-bit errors. In a memory system using SECDED, each data word is accompanied by an extra bit or bits that are calculated based on the contents of the data word. These extra bits are then stored along with the data word. When the data word is read from memory, the system uses the extra bits to detect and correct any single-bit errors that may have occurred during storage or transmission. If a double-bit error is detected, the system will recognize that the data is corrupted beyond repair and take appropriate action, such as requesting a retransmission of the data. SECDED is an important technology for ensuring the reliability and integrity of computer memory and storage systems, and is widely used in applications where data accuracy is critical, such as in aerospace, defense, and medical devices.

SECDED codes are calculated using a mathematical algorithm that involves adding redundant bits to the data word being transmitted or stored. The extra bits are calculated in such a way that they can be used to detect and correct errors. The SECDED algorithm uses Hamming codes in part, which are a class of linear error-correcting codes. The Hamming code adds parity bits to the data word based on its binary representation. The parity bits are chosen so that they allow the receiver to detect and correct any single-bit errors that may have occurred during transmission.

To add the redundant bits to the data word using the SECDED algorithm, the following steps are typically followed:

Determine the number of bits in the data word, which is represented by "n".

Determine the number of redundant bits needed.

Create an empty codeword of length "n+r".

Fill in the data bits of the codeword with the original data.

Calculate the redundant bits based on the Hamming code algorithm. These bits are typically calculated by XORing specific subsets of the data bits in the codeword.

The exact calculation method depends on the specific SECDED code being used.

Store or transmit the codeword, which now includes the original data and the redundant bits.

Overall, the SECDED algorithm adds redundancy to data in a way that allows for efficient detection and correction of errors, improving the reliability and integrity of computer memory and storage systems.

Generally:
Each transaction from a memory die has 68 bits . . . for a total of 680 bits for the ten memory dies (e.g., dies 12, 14, 16, 18, 20, 22, 24, 26, 28, 30).

the ten memory dies (e.g., dies 12, 14, 16, 18, 20, 22, 24, 26, 28, 30) are divided into three groups: two groups of 3½ memory die transaction and one group of 3 memory die transaction.

So for Group 1:
Group 1 includes 3½ memory die transactions (i.e., memory dies 12, 14, 16 and a first half of memory die 18) having a total capacity of 238 bits (i.e., 68 bits per memory die×3.5 memory dies).

These 3½ memory dies hold 224 bits of data (64 bits×3.5 memory dies) and 14 bits (238-224) are available for supplemental information.

8 bits (of the 14 bits available for supplemental information) may be used for SEC parity (e.g., parity bit group 200) for Group 1 that needs 8 bits of parity, thus leaving 6 bits (14-8) available for supplemental information. Note that SEC here uses 224 bits of data and 2 bits of metadata and 4 bits of SECDED to generate 8 SEC parity bits. Therefore, the SEC is a code of SEC (238, 230).

4 bits (of the 6 bits available for supplemental information) may be used for SECDED parity (e.g., symbol 210) for the first group of parity bits (e.g., parity bits 216). This is a SECDED (8, 4) using 4 bits of parities 216 and generates 4 bits of SECDED parity. Thus leaving 2 bits (6-4) available for supplemental information.

Accordingly, these 2 bits are available for the storing of supplemental information (e.g., metadata 222).

And for Group 2:
Group 2 includes 3½ memory dies (i.e., a second half of memory die 18 and memory dies 20, 22, 24) having a total capacity of 238 bits (i.e., 68 bits per memory die×3.5 memory dies).

These 3½ memory dies hold 224 bits of data (64 bits×3.5 memory dies) and 14 bits (238-224) are available for supplemental information.

8 bits (of the 14 bits available for supplemental information) may be used for SEC parity (e.g., parity bit group 202) for Group 2 that needs 8 bits of parity, thus leaving 6 bits (14-8) available for supplemental information. Note that SEC here uses 224 bits of data and 2 bits of metadata and 4 bits of SECDED to generate 8 SEC parity bits. Therefore, the SEC is a code of SEC (238, 230).

4 bits (of the 6 bits available for supplemental information) may be used for SECDED parity (e.g., symbol 212) for the second group of parity bits (e.g., parity bits 218). This is a SECDED (8, 4) using 4 bits of parities 216 and generates 4 bits of SECDED parity. Thus leaving 2 bits (6-4) available for supplemental information.

Accordingly, these 2 bits are available for the storing of supplemental information (e.g., metadata 224).

And for Group 3:
Group 3 includes 3 memory dies (i.e., memory dies 26, 28, 30) having a total capacity of 204 bits (i.e., 68 bits per memory die×3 memory dies).

These 3 memory dies hold 192 bits of data (64 bits×3 memory dies) and 12 bits (204-192) are available for supplemental information.

8 bits (of the 12 bits available for supplemental information) may be used for SEC parity (e.g., parity bit group 204) for Group 3 that needs 8 bits of parity, thus leaving 4 bits (12-8) available for supplemental information. Note that SEC here uses 192 bits of data and 1 bit of metadata and 3 bits of SECDED to generate 8 SEC parity bits. Therefore, the SEC is a code of SEC (204, 196).

3 bits (of the 4 bits available for supplemental information) may be used for SECDED parity (e.g., symbol 214) for the third group of parity bits (e.g., parity bits 220). This is a SECDED (6, 3) using 3 bits of parities 220 and generates 3 bits of SECDED parity. Thus leaving 1 bit (4-3) available for supplemental information.

Accordingly, this 1 bit is available for the storing of supplemental information (e.g., metadata 226).

Overall and in the above-described configuration, a total of 5 bits is available for storing metadata (e.g., metadata 222, 224, 226).

Data Protection Using a Single SECDED:

While the above-described configuration utilized a separate SECDED parity (e.g., symbols 210, 212, 214) for each group of memory dies, this is for illustrative purposes only and is not intended to be a limitation of this disclosure, as other configurations are possible and are considered to be within the scope of this disclosure. For example, the below-described configuration utilizes a single SECDED parity (e.g., symbol 210) for all groups of memory dies.

Figure 4:
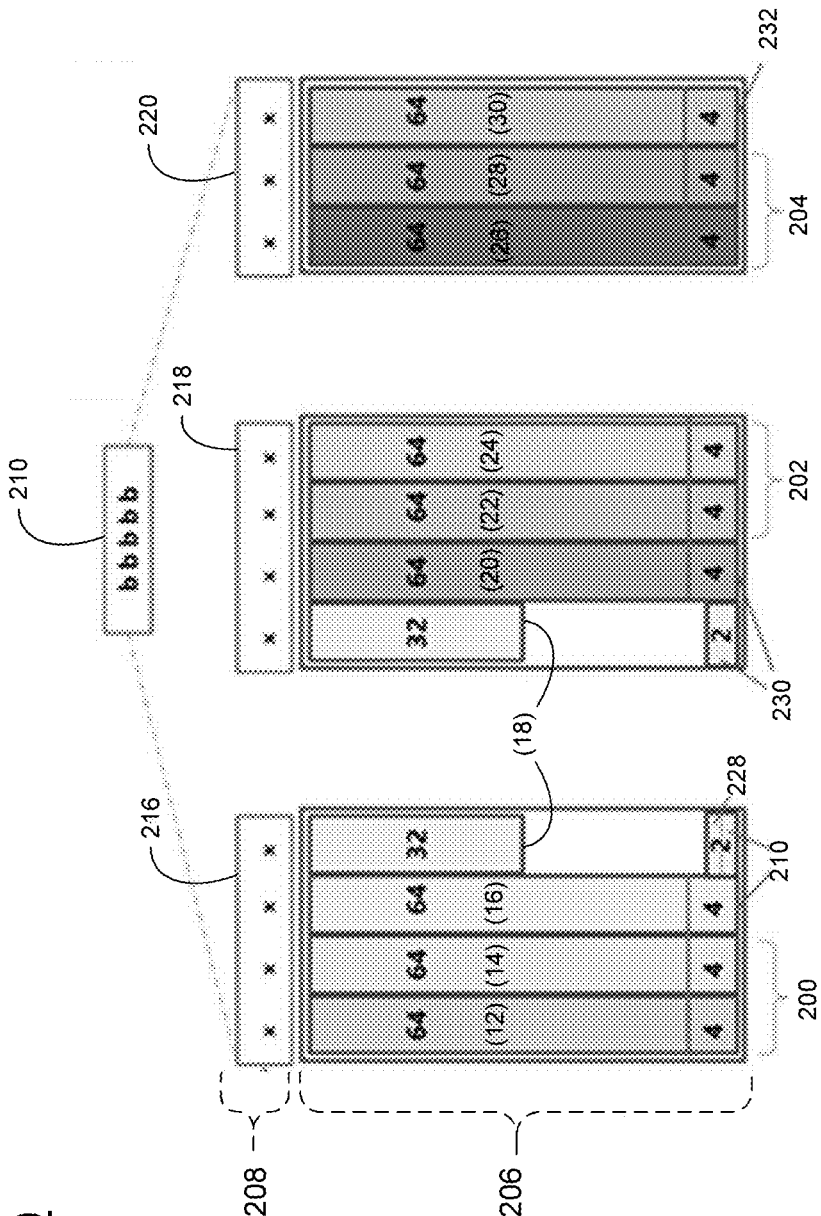
FIG. 4 is a diagrammatic view of a DDR6 memory and another implementation of the data protection process of FIG. 2.

Referring also to FIG. 4, data protection process 100 may define 102 one or groups (e.g., parity bit group 200, 202, 204) for data (e.g., data 206) included within each of a plurality of memory dies (e.g., each of dies 12, 14, 16, 18, 20, 22, 24, 26, 28, 30) of a memory module (e.g., DDR6 memory module 10), thus defining a first group of parity bit groups (e.g., parity bit groups 200, 202, 204).

For example:
data protection process 100 may define 102 parity bit group 200 for the data (e.g., data 206) included within memory dies 12, 14, 16 and a first half of memory die 18, wherein parity bit group 200 may enable data protection process 100 to correct and/or identify data errors included within memory dies 12, 14, 16 and the first half of memory die 18;

data protection process 100 may define 102 parity bit group 202 for the data (e.g., data 206) included within a second half of memory die 18 and memory dies 20, 22, 24, wherein parity bit group 202 may enable data protection process 100 to correct and/or identify data errors included within the second half of memory die 18 and memory dies 20, 22, 24; and data protection process 100 may define 102 parity bit group 204 for the data (e.g., data 206) included within memory dies 26, 28, 30, wherein parity bit group 204 may enable data protection process 100 to correct and/or identify data errors included within memory dies 26, 28, 30.

As discussed above and when defining 102 one or more groups (e.g., parity bit groups 200, 202, 204) for data (e.g., data 206) included within each of a plurality of memory dies (e.g., each of dies 12, 14, 16, 18, 20, 22, 24, 26, 28, 30) of a memory module (e.g., DDR6 memory module 10), thus defining a first group of parity bit groups (e.g., parity bit groups 200, 202, 204), data protection process 100 may define 104 one or more SEC groups (e.g., parity bit groups 200, 202, 204) for data (e.g., data 206) included within each of a plurality of memory dies (e.g., each of dies 12, 14, 16, 18, 20, 22, 24, 26, 28, 30) of a memory module (e.g., DDR6 memory module 10).

As discussed above, data protection process 100 may define 106 a parity bit (e.g., an odd parity bit or an even parity bit) for each memory die (e.g., each of dies 12, 14, 16, 18, 20, 22, 24, 26, 28, 30) included within the one or more groups of memory dies (e.g., dies 12, 14, 16, 18, 20, 22, 24, 26, 28, 30), thus defining a plurality of parity bits (e.g., parity bits 208).

As discussed above, data protection process 100 may define 108 one or more symbols (e.g., symbol 210) for the plurality of parity bits (e.g., parity bits 208), thus defining a second group of parity symbols (e.g., symbol 210).

For example and as discussed above:
 a first group of parity bits (e.g., parity bits 216) may be defined 106 for memory dies 12, 14, 16 and a first half of memory die 18;
 a second group of parity bits (e.g., parity bits 218) may be defined 106 for a second half of memory die 18 and memory dies 20, 22, 24;
 a third group of parity bits (e.g., parity bits 220) may be defined 106 for memory dies 26, 28, 30; and
 data protection process 100 may define 108 one or more symbols (e.g., symbol 210) for the combination of the first, second & third groups of parity bits (e.g., parity bits 216, 218, 220), wherein symbol 210 may enable data protection process 100 to correct and/or identify data errors included within memory dies 12, 14, 16, 18, 20, 22, 24, 26, 28, 30.

As discussed above and when defining 108 one or more symbols (e.g., symbol 210) for the plurality of parity bits (e.g., parity bits 208), thus defining a second group of parity symbols (e.g., symbol 210), data protection process 100 may define 110 one or more SECDED symbols (e.g., symbol 210) for the plurality of parity bits (e.g., parity bits 208). Generally:
 Each memory die has 68 bits . . . for a total of 680 bits for the ten memory dies (e.g., dies 12, 14, 16, 18, 20, 22, 24, 26, 28, 30).
 the ten memory dies (e.g., dies 12, 14, 16, 18, 20, 22, 24, 26, 28, 30) are divided into three groups: two groups of 3½ memory dies and one group of 3 memory dies.
So for Group 1:
 Group 1 includes 3½ memory dies (i.e., memory dies 12, 14, 16 and a first half of memory die 18) having a total capacity of 238 bits (i.e., 68 bits per memory die×3.5 memory dies).
 These 3½ memory dies hold 224 bits of data (64 bits×3.5 memory dies) and 14 bits (238-224) are available for supplemental information.
 8 bits (of the 14 bits available for supplemental information) may be used for SEC parity (e.g., parity bit group 200) for Group 1 (as Group 1 is 238 bits and, therefore, between 128-255 bits), thus leaving 6 bits (14-8) available for supplemental information. SEC input bits are all data on this group. As such, it is SEC (238, 230), generating 8 bits of SEC parity.
 5 bits (of the 6 bits available for supplemental information) may be used for SECDED parity (e.g., symbol 210) for the three groups of parity bits (e.g., parity bits 216, 218, 220), thus leaving 1 bit (6-5) available for supplemental information.
 Accordingly, this 1 bit is available for the storing of supplemental information (e.g., metadata 228).
And for Group 2:
 Group 2 includes 3½ memory dies (i.e., a second half of memory die 18 and memory dies 20, 22, 24) having a total capacity of 238 bits (i.e., 68 bits per memory die×3.5 memory dies).
 These 3½ memory dies hold 224 bits of data (64 bits×3.5 memory dies) and 14 bits (238-224) are available for supplemental information.
 8 bits (of the 14 bits available for supplemental information) may be used for SEC parity (e.g., parity bit group 202) for Group 2 (as Group 2 is 238 bits and, therefore, between 128-255 bits), thus leaving 6 bits (14-8) available for supplemental information. SEC input bits are all data on this group. As such, it is SEC (238, 230), generating 8 bits of SEC parity.
 Accordingly, these 6 bits are available for the storing of supplemental information (e.g., metadata 230).
And for Group 3:
 Group 3 includes 3 memory dies (i.e., memory dies 26, 28, 30) having a total capacity of 204 bits (i.e., 68 bits per memory die×3 memory dies).
 These 3 memory dies hold 192 bits of data (64 bits×3 memory dies) and 12 bits (204-192) are available for supplemental information.
 8 bits (of the 12 bits available for supplemental information) may be used for SEC parity (e.g., parity bit group 204) for Group 3 (as Group 3 is 204 bits and, therefore, between 128-255 bits), thus leaving 4 bits (12-8) available for supplemental information. SEC input bits are all data on this group. As such, it is SEC (204, 196), generating 8 bits of SEC parity.
 Accordingly, these 4 bits are available for the storing of supplemental information (e.g., metadata 232).
 Overall in 3 groups there are 11 bits available for storing the supplemental data.

Data Protection Using a Single SECDED & an RS Code:

While neither of the above-described configurations utilized Reed-Solomon encoding, this is for illustrative purposes only and is not intended to be a limitation of this disclosure, as other configurations are possible and are considered to be within the scope of this disclosure. For example, the below-described configuration utilizes Reed-Solomon encoding (in addition to SEC encoding and SECDED encoding) to provide a higher level of data recovery.

Figure 5:
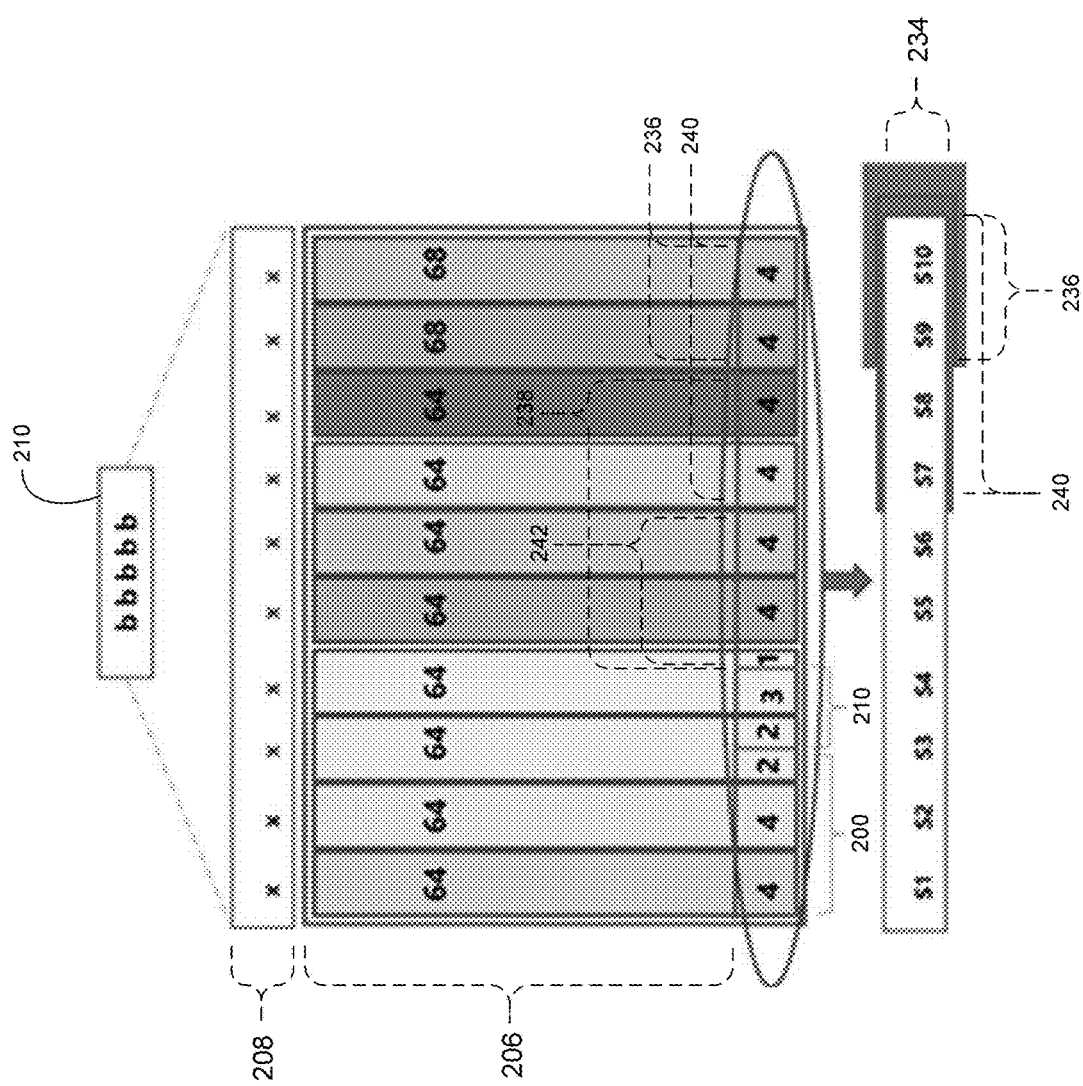
FIG. 5 is a diagrammatic view of a DDR6 memory and another implementation of the data protection process of FIG. 2.

Referring also to FIG. 5, data protection process 100 may define 102 one or more groups (e.g., parity bit group 200) for data (e.g., data 206) included within each of a plurality of memory dies (e.g., each of dies 12, 14, 16, 18, 20, 22, 24, 26, 28, 30) of a memory module (e.g., DDR6 memory module 10), thus defining a first group of parity bit groups (e.g., parity bit group 200).

For example:
 data protection process 100 may define 102 parity bit group 200 for the data (e.g., data 206) included within memory dies 12, 14, 16, 18, 20, 22, 24, 26, 28 30.

As discussed above and when defining 102 one or more groups (e.g., parity bit group 200) for data (e.g., data 206) included within each of a plurality of memory dies (e.g., each of dies 12, 14, 16, 18, 20, 22, 24, 26, 28, 30) of a memory module (e.g., DDR6 memory module 10), thus defining a first group of parity bit groups (e.g., parity bit group 200), data protection process 100 may define 104 one or more SEC groups (e.g., parity bit group 200) for data (e.g., data 206) included within each of a plurality of memory dies (e.g., each of dies 12, 14, 16, 18, 20, 22, 24, 26, 28, 30) of a memory module (e.g., DDR6 memory module 10).

As discussed above, data protection process 100 may define 106 a parity bit (e.g., an odd parity bit or an even parity bit) for each memory die (e.g., each of dies 12, 14, 16, 18, 20, 22, 24, 26, 28, 30) included within the one or more groups of memory dies (e.g., dies 12, 14, 16, 18, 20, 22, 24, 26, 28, 30), thus defining a plurality of parity bits (e.g., parity bits 208).

Data protection process 100 may define 108 one or more symbols (e.g., symbol 210) for the plurality of parity bits (e.g., parity bits 208), thus defining a second group of parity symbols (e.g., symbol 210).

For example and as discussed above:
parity bits 208 may be defined 106 for memory dies 12, 14, 16, 18, 20, 22, 24, 26, 28, 30; and
data protection process 100 may define 108 one or more symbols (e.g., symbol 210) for all of the parity bits (e.g., parity bits 208), wherein symbol 210 may enable data protection process 100 to correct and/or identify data errors included within memory dies 12, 14, 16, 18, 20, 22, 24, 26, 28, 30.

As discussed above and when defining 108 one or more symbols (e.g., symbol 210) for the plurality of parity bits (e.g., parity bits 208), thus defining a second group of symbols (e.g., parity bits 208), thus defining a second group of symbols (e.g., symbol 210), data protection process 100 may define 110 one or more SECDED symbols (e.g., symbol 210) for the plurality of parity bits (e.g., parity bits 208).

Data protection process 100 may generate 112 RS parities (e.g., RS parities 234) for the first group of parity bit groups (e.g., parity bit group 200) and the second group of symbols (e.g., symbol 210), wherein implementations of the RS parities (e.g., RS parities 234) may include codewords that enable the restoration of lost or corrupted data.

Examples of the RS parities (e.g., RS parities 234) may include but are not limited to a Reed-Solomon codeword. Reed-Solomon is a type of error-correcting code that is commonly used in digital communication systems, such as satellite and wireless communication, as well as in storage systems, such as CD, DVD, and Blu-ray discs. Reed-Solomon codes use a combination of error detection and correction techniques to protect against errors in data transmission or storage. They work by adding redundant information, or parity check symbols, to the data being transmitted or stored. These parity check symbols allow the receiver to detect and correct any errors that may have occurred during transmission or storage. The Reed-Solomon code is based on the theory of finite fields, which are mathematical structures that allow arithmetic operations to be performed on a limited set of elements. The Reed-Solomon code is designed to work over any finite field.

The Reed-Solomon encoding process typically involves several steps:
The data to be encoded is split into symbols, each containing a fixed number of symbols.
A number of parity symbols are generated based on the data symbols. The number of parity symbols is determined by the desired level of error correction.
The data symbols and parity symbols are combined to form a larger block, named codeword, which is transmitted or stored.

The decoding process involves the following steps:
The received block is split into its data and parity symbols.
The received data symbols are checked for errors using the received parity symbols.
If errors are detected, the decoder uses the parity symbols to correct the errors.

Reed-Solomon codes are particularly useful in situations where errors are likely to occur in bursts, as they can correct multiple errors in a single symbol. They are also efficient in terms of the number of parity symbols required to provide a given level of error correction, making them well-suited for use in low-bandwidth communication channels or storage systems with limited space.

Reed-Solomon (10, 8):
If the need to store more supplemental information (e.g., metadata) is prioritized over the ability to recover data, Reed-Solomon (10,8) encoding may be utilized. This code uses the symbols of 4 bits each. Accordingly and when generating 112 RS parities (e.g., RS parities 234) for the first group of parity bit groups (e.g., parity bit group 200), the second group of parity symbols (e.g., symbol 210), and the metadata needed to be stored, data protection process 100 may generate 114 8-bit RS parities (e.g., RS parities 236) in form of one or more RS parity symbols for the first group of parity bit groups (e.g., parity bit group 200) and the second group of parity symbols (e.g., symbol 210) using Reed-Solomon (10, 8) encoding.

Reed-Solomon (10, 8) refers to a specific variant of the Reed-Solomon error correction code. The notation (n, k) represents the parameters of the code, where "n" is the total number of symbols or characters in a codeword, and "k" is the number of data symbols in the codeword. In the case of Reed-Solomon (10, 8), each codeword consists of 10 symbols, and out of those 10 symbols, 8 symbols are used for data. The remaining 2 symbols are redundancy or parity symbols, which are added to provide error correction capabilities. Reed-Solomon codes are widely used for error detection and correction in various applications, including data storage, wireless communication, and optical communication. They are capable of correcting multiple symbol errors within a codeword and are particularly effective against burst errors, where consecutive symbols are affected. In the case of Reed-Solomon (10, 8), the code can correct up to 1 symbol error within a codeword. This means that if a single symbol within the codeword is corrupted during transmission or reading from memory, the code can detect the error and correct it. The specific implementation details of the Reed-Solomon code, such as the specific mathematical operations used for encoding and decoding, may vary depending on the system and application. Reed-Solomon codes are characterized by their ability to handle a wide range of error patterns and offer a high level of error correction capability.

When Utilizing Reed-Solomon (10, 8):
Each memory die (e.g., dies 12, 14, 16, 18, 20, 22, 24, 26, 28, 30) has 68 bits . . . for a total of 680 bits for the ten memory dies (e.g., dies 12, 14, 16, 18, 20, 22, 24, 26, 28, 30).
These 10 dies (e.g., dies 12, 14, 16, 18, 20, 22, 24, 26, 28, 30) hold 640 bits of data . . . and 40 bits are available (680-40) for supplemental information.
10 bits (of the 40 bits available for supplemental information) may be used for SEC parity (e.g., parity bit group 200) for this group (as it is between 512-1023 bits), thus leaving 30 bits available (40-10) for supplemental information.

An even/odd parity (e.g., parity bits 208) is calculated for each of the 10 dies (e.g., dies 12, 14, 16, 18, 20, 22, 24, 26, 28, 30), wherein these 1-bit even/odd parities (e.g., parity bits 208) are calculated but are not stored.

From these ten 1-bit even/odd parities (e.g., parity bits 208), a 5-bit SECDED parity (e.g., symbol 210) is generated that covers all 10 dies (e.g., dies 12, 14, 16, 18, 20, 22, 24, 26, 28, 30).

5 bits (of the 30 bits available for supplemental information) may be used to store the SECDED parity (e.g., symbol 210) for this group, thus leaving 25 bits available (30-5) for supplemental information.

8-bit RS code parity in form of two RS symbols (e.g., RS code 236) is calculated (via RS 10, 8, which can correct one symbol error) for the ten 4-bit symbols stored within the 40 additional bits.

8 bits (of the 25 bits available for supplemental information) may be used to store the 8-bit RS code parity (e.g., two RS symbol 236), thus leaving 17 bits available (25-8) available for supplemental information.

Accordingly, these 17 bits are available for the storing of supplemental information (e.g., metadata 238).

Reed-Solomon (10, 6):

If the ability to recover data is prioritized over the need to store more supplemental information (e.g., metadata), Reed-Solomon (10,6) encoding with 4-bit symbols may be utilized. Accordingly and when generating 112 RS parities (e.g., RS parities 234) for the first group of parity bit groups (e.g., parity bit group 200) and the second group of parity symbols (e.g., symbol 210), data protection process 100 may generate 116 16-bit RS parities (e.g., four RS parity symbol of 4 bits each 240) in form of one or more RS parity symbols for the first group of parity bit groups (e.g., parity bit group 200), the second group of parity symbols (e.g., symbol 210) and 9 bits metadata, using Reed-Solomon (10, 6) encoding.

Reed-Solomon (10, 6) refers to another variant of the Reed-Solomon error correction code. The parameters (n, k) represent the number of symbols in the codeword, where "n" is the total number of symbols and "k" is the number of data symbols. In the case of Reed-Solomon (10, 6), each codeword consists of 10 symbols, and out of those 10 symbols, 6 symbols are used for data. The remaining 4 symbols are redundancy or parity symbols, which are added to provide error correction capabilities. Reed-Solomon codes are widely used for error detection and correction in various applications, including data storage, wireless communication, and optical communication. They are capable of correcting multiple symbol errors within a codeword and are particularly effective against burst errors. With Reed-Solomon (10, 6), the code can correct up to 2 symbol errors within a codeword. This means that if up to two symbols within the codeword are corrupted during transmission or reading from memory, the code can detect the errors and correct them. Reed-Solomon codes employ mathematical operations such as polynomial arithmetic to encode and decode data. The specific implementation details can vary, but the basic principles of Reed-Solomon codes involve generating and manipulating polynomials to create the parity symbols for error detection and correction. Reed-Solomon (10, 6) provides a higher level of error correction capability compared to Reed-Solomon (10, 8) because it can correct up to 2 symbol errors. However, it uses fewer data symbols, which means there is less available space for the actual data in each codeword. The choice of the specific (n, k) parameters depends on the specific requirements of the system and the desired balance between error correction capability and data storage efficiency.

When Utilizing Reed-Solomon (10, 6):

Each memory die (e.g., dies 12, 14, 16, 18, 20, 22, 24, 26, 28, 30) has 68 bits . . . for a total of 680 bits for the ten memory dies (e.g., dies 12, 14, 16, 18, 20, 22, 24, 26, 28, 30).

These 10 dies (e.g., dies 12, 14, 16, 18, 20, 22, 24, 26, 28, 30) hold 640 bits of data . . . and 40 bits are available (680-40) for supplemental information.

10 bits (of the 40 bits available for supplemental information) may be used for SEC parity (e.g., parity bit group 200) for this group (as it is between 512-1023 bits), thus leaving 30 bits available (40-10) for supplemental information.

An even/odd parity (e.g., parity bits 208) is calculated for each of the 10 dies (e.g., dies 12, 14, 16, 18, 20, 22, 24, 26, 28, 30), wherein these 1-bit even/odd parities (e.g., parity bits 208) are calculated but are not stored.

From these ten 1-bit even/odd parities (e.g., parity bits 208), a 5-bit SECDED parity (e.g., symbol 210) is generated that covers all 10 dies (e.g., dies 12, 14, 16, 18, 20, 22, 24, 26, 28, 30).

5 bits (of the 30 bits available for supplemental information) may be used to store the SECDED parity (e.g., symbol 210) for this group, thus leaving 25 bits available (30-5) for supplemental information 16-bit RS code parity in form of four RS symbols (e.g., RS code 240) is calculated (via RS (10, 6), which can correct two symbol errors) for the ten 4-bit symbols stored within the 40 additional bits.

16 bits (of the 25 bits available for supplemental information) may be used to store the 16-bit RS code (e.g., RS code 240), thus leaving 9 bits (25-16) available for supplemental information.

Accordingly, these 9 bits are available for the storing of supplemental information (e.g., metadata 242).

Data Recovery:

Data protection process 100 may recover 116 one or more portions of the data (e.g., data 206) included within each of the plurality of memory dies (e.g., dies 12, 14, 16, 18, 20, 22, 24, 26, 28, 30) of the memory module (e.g., DDR6 memory module 10) in the event of data corruption and/or die failure using the first group of parity bit groups (e.g., one or more of parity bit groups 200, 202, 204) and/or the second group of parity symbols (e.g., symbols 210, 212, 214). Additionally and in the event that RS parities (e.g., RS parities 234) are generated 112, data protection process 100 may utilize the same to recover 116 one or more portions of the data (e.g., data 206) included within each of the plurality of memory dies (e.g., dies 12, 14, 16, 18, 20, 22, 24, 26, 28, 30) of the memory module (e.g., DDR6 memory module 10) in the event of data corruption and/or die failure.

As discussed above, the first group of parity bit groups (e.g., one or more of parity bit groups 200, 202, 204) may include one or more SEC groups for data 206 included within each of a plurality of memory dies (e.g., each of dies 12, 14, 16, 18, 20, 22, 24, 26, 28, 30) of a memory module (e.g., DDR6 memory module 10).

As also discussed above, SEC (Single Error Correction) is a method used to detect and correct errors in data transmission or storage systems. It is commonly used in applications such as digital communications, storage devices, and error correction codes. The basic idea behind SEC encoding is to add redundancy to the original data in a structured manner, which allows for the detection and correction of errors. This is typically done by adding additional bits, called parity or check bits, to the original data.

Here's a simplified explanation of how SEC encoding works:
  Data Division: The original data is divided into fixed-size blocks or packets. Each block consists of both the original data bits and additional parity bits.
  Parity Calculation: For each block, the parity bits are calculated based on the values of the original data bits. The specific method used to calculate the parity bits depends on the type of SEC code being used.
  Error Detection: During transmission or storage, errors may occur, causing bits to be flipped or corrupted. By comparing the received data with the parity bits, it is possible to detect the presence of errors. If the received data matches the calculated parity bits, no errors are detected. However, if discrepancies are found, errors are present.
  Error Correction: Once errors are detected, the SEC encoding scheme allows for the correction of some types of errors. The specific method of error correction varies depending on the code used. Generally, error correction is achieved by analyzing the parity bits and using them to identify and fix the erroneous bits.
  Decoding: The corrected data is extracted from the received blocks, and the original information is reconstructed. If the SEC code allows for error correction, the decoded data should match the original data, except for rare cases where uncorrectable errors occur.

It's important to note that different SEC codes have different properties, such as the number of errors they can detect or correct, the overhead they introduce in terms of additional bits, and their complexity. The choice of a particular SEC code depends on the requirements of the specific application, including the desired error detection and correction capabilities, available resources, and the level of reliability needed. Overall, SEC encoding provides a way to enhance data integrity and robustness in systems where errors are likely to occur, ensuring accurate and reliable transmission or storage of information.

As discussed above, the second group of parity symbols (e.g., one or more of parity symbols 210, 212, 214) may include one or more SECDED symbols for the plurality of parity bits (e.g., parity bits 208).

As also discussed above, SECDED (Single Error Correction, Double Error Detection) is a type of error-correcting code used in computer memory and storage systems. It is designed to detect and correct single-bit errors, and to detect double-bit errors. In a memory system using SECDED, each data word is accompanied by an extra bit or bits that are calculated based on the contents of the data word. These extra bits are then stored along with the data word. When the data word is read from memory, the system uses the extra bits to detect and correct any single-bit errors that may have occurred during storage or transmission. If a double-bit error is detected, the system will recognize that the data is corrupted beyond repair and take appropriate action, such as requesting a retransmission of the data. SECDED is an important technology for ensuring the reliability and integrity of computer memory and storage systems, and is widely used in applications where data accuracy is critical, such as in aerospace, defense, and medical devices.

SECDED codes are calculated using a mathematical algorithm that involves adding redundant bits to the data word being transmitted or stored. The extra bits are calculated in such a way that they can be used to detect and correct errors. The SECDED algorithm uses Hamming codes in part, which are a class of linear error-correcting codes. The Hamming code adds parity bits to the data word based on its binary representation. The parity bits are chosen so that they allow the receiver to detect and correct any single-bit errors that may have occurred during transmission.

To add the redundant bits to the data word using the SECDED algorithm, the following steps are typically followed:
  Determine the number of bits in the data word, which is represented by "n".
  Determine the number of redundant bits needed.
  Create an empty codeword of length "n+r".
  Fill in the data bits of the codeword with the original data.
  Calculate the redundant bits based on the Hamming code algorithm. These bits are typically calculated by XOR-ing specific subsets of the data bits in the codeword. The exact calculation method depends on the specific SECDED code being used.
  Store or transmit the codeword, which now includes the original data and the redundant bits.

Overall, the SECDED algorithm adds redundancy to data in a way that allows for efficient detection and correction of errors, improving the reliability and integrity of computer memory and storage systems.

As discussed above, data protection process 100 may generate RS parities (e.g., RS parities 234) for the first group of parity bit groups (e.g., parity bit group 200) and the second group of parity symbols (e.g., symbol 210).

As also discussed above, examples of the RS parities (e.g., RS parities 234) may include but are not limited to a Reed-Solomon codeword, wherein Reed-Solomon is a type of error-correcting code that is commonly used in digital communication systems, such as satellite and wireless communication, as well as in storage systems, such as CD, DVD, and Blu-ray discs.

Reed-Solomon codes use a combination of error detection and correction techniques to protect against errors in data transmission or storage. They work by adding redundant information, or parity check symbols, to the data being transmitted or stored. These parity check symbols allow the receiver to detect and correct any errors that may have occurred during transmission or storage. The Reed-Solomon code is based on the theory of finite fields, which are mathematical structures that allow arithmetic operations to be performed on a limited set of elements. The Reed-Solomon code is designed to work over any finite field.

The Reed-Solomon encoding process typically involves several steps:
  The data to be encoded is split into blocks, each containing a fixed number of symbols.
  A number of parity symbols are generated based on the data symbols in each block. The number of parity symbols is determined by the desired level of error correction.
  The data symbols and parity symbols are combined to form a larger block, which is transmitted or stored.
  The decoding process involves the following steps:
  The received block is split into its data and parity symbols.
  The received data symbols are checked for errors using the received parity symbols.
  If errors are detected, the decoder uses the parity symbols to correct the errors.

Reed-Solomon codes are particularly useful in situations where errors are likely to occur in bursts, as they can correct multiple errors in a single symbol. They are also efficient in terms of the number of parity symbols required to provide a given level of error correction, making them well-suited for use in low-bandwidth communication channels or storage systems with limited space.

Accordingly, the manner in which data protection process 100 recovers 116 one or more portions of the data (e.g., data 206) included within each of the plurality of memory dies (e.g., dies 12, 14, 16, 18, 20, 22, 24, 26, 28, 30) of the memory module (e.g., DDR6 memory module 10) in the event of data corruption and/or die failure may vary depending upon the combination of "tools" available to data protection process 100, wherein examples of these tools may include one or more SEC codes (e.g., one or more of parity bit groups 200, 202, 204), one or more SECDED codes (e.g., one or more of symbols 210, 212, 214), one or more Reed-Solomon codes (e.g., RS parities 234) and/or one or more calculated parities (e.g., parity bits 208).

System Overview:

In some implementations, data protection process 100 may be implemented as an entirely hardware embodiment, an entirely software embodiment (including firmware, resident software, micro-code, etc.) or an embodiment combining software and hardware aspects that may all generally be referred to herein as a "circuit," "module". "process" or "system."

The instruction sets and subroutines of data protection process 100, which may be stored on storage device 58 coupled to DDR6 memory module 10, may be executed by one or more processors (e.g., processor 60) and one or more memory architectures (e.g., memory architecture 62) included within DDR6 memory module 10. Examples of storage device 58 may include but are not limited to: a random access memory (RAM); a read-only memory (ROM); and all forms of flash memory storage devices.

General:

The present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module", "process" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   selecting one or more groups for data included within one or more groups of memory dies included within a memory module, thus defining a first group of parity bit groups;
   selecting a parity bit for each memory die included within the one or more groups of memory dies, thus defining a plurality of parity bits;
   selecting one or more symbols for the plurality of parity bits, thus defining a second group of parity symbols;
   generating Reed-Solomon (RS) parities for the first group of parity bit groups and the second group of parity symbols and metadata by generating 8-bit RS parities formed with one or more RS parity symbols for the first group of parity bit groups and the second group of parity symbols and a remaining number of supplemental bits storing metadata, using Reed-Solomon (10, 8) encoding; and
   recovering one or more portions of the data included within each of the plurality of memory dies of the memory module in an event of data corruption and/or die failure using the first group of parity bit groups and/or the second group of parity symbols.

2. The computer implemented method of claim 1 wherein selecting one or more groups for data included within one or more groups of memory dies included within a memory module, thus defining a first group of parity bit groups includes:
   defining one or more SEC groups for data included within one or more groups of memory dies included within a memory module.

3. The computer implemented method of claim 1 wherein selecting one or more symbols for the plurality of parity bits, thus defining a second group of parity bit symbols includes:
   defining one or more SECDED symbols for the plurality of parity bits.

4. The computer implemented method of claim 1 wherein generating RS parities for the first group of parity bit groups and the second group of parity symbols and metadata includes:
   generating 16-bit RS parities in form of one or more RS parity symbols for the first group of parity bit groups and the second group of parity symbols using Reed-Solomon (10, 6) encoding.

5. A computer program product residing on a non-transitory computer readable medium having a plurality of instructions stored thereon which, when executed by a processor, cause the processor to perform operations comprising:
   selecting one or more groups for data included within one or more groups of memory dies included within a memory module, thus defining a first group of parity bit groups;
   selecting a parity bit for each memory die included within the one or more groups of memory dies, thus defining a plurality of parity bits;
   selecting one or more symbols for the plurality of parity bits, thus defining a second group of parity symbols;
   generating Reed-Solomon (RS) parities for the first group of parity bit groups and the second group of parity symbols and metadata by generating 8-bit RS parities formed with one or more RS parity symbols for the first group of parity bit groups and the second group of parity symbols and a remaining number of supplemental bits storing metadata, using Reed-Solomon (10, 8) encoding; and
   recovering one or more portions of the data included within each of the plurality of memory dies of the memory module in an event of data corruption and/or die failure using the first group of parity bit groups and/or the second group of parity symbols.

6. The computer program product of claim 5 wherein selecting one or more groups for data included within one or more groups of memory dies included within a memory module, thus defining a first group of parity bit groups includes:
   defining one or more SEC groups for data included within one or more groups of memory dies included within a memory module.

7. The computer program product of claim 5 wherein selecting one or more symbols for the plurality of parity bits, thus defining a second group of parity bit symbols includes:
   defining one or more SECDED symbols for the plurality of parity bits.

8. The computer program product of claim 5 wherein generating RS parities for the first group of parity bit groups and the second group of parity symbols and metadata includes:

generating 16-bit RS parities in form of one or more RS parity symbols for the first group of parity bit groups and the second group of symbols groups using Reed-Solomon (10, 6) encoding.

9. A computing system including a processor and memory configured to perform operations comprising:
- selecting one or more groups for data included within one or more groups of memory dies included within a memory module, thus defining a first group of parity bit groups;
- selecting a parity bit for each memory die included within the one or more groups of memory dies, thus defining a plurality of parity bits;
- selecting one or more symbols for the plurality of parity bits, thus defining a second group of parity symbols;
- generating Reed-Solomon (RS) parities for the first group of parity bit groups and the second group of parity symbols and metadata by generating 8-bit RS parities formed with one or more RS parity symbols for the first group of parity bit groups and the second group of parity symbols and a remaining number of supplemental bits storing metadata, using Reed-Solomon (10, 8) encoding; and
- recovering one or more portions of the data included within each of the plurality of memory dies of the memory module in an event of data corruption and/or die failure using the first group of parity bit groups and/or the second group of parity symbols.

10. The computing system of claim 9 wherein selecting one or more groups for data included within one or more groups of memory dies included within a memory module, thus defining a first group of parity bit groups includes:
- defining one or more SEC groups for data included within one or more groups of memory dies included within a memory module.

11. The computing system of claim 9 wherein selecting one or more symbols for the plurality of parity bits, thus defining a second group of parity bit symbols includes:
- defining one or more SECDED symbols for the plurality of parity bits.

12. The computing system of claim 9 wherein generating RS parities for the first group of parity bit groups and the second group of parity bit groups and metadata includes:
- generating 16-bit RS parities in form of one or more RS parity symbols for the first group of parity bit groups and the second group of parity symbols using Reed-Solomon (10, 6) encoding.

* * * * *